(12) United States Patent
Chen

(10) Patent No.: US 6,799,807 B1
(45) Date of Patent: Oct. 5, 2004

(54) CHILD SAFETY CHAIR WITH A BELT-ADJUSTING UNIT

(75) Inventor: Shun-Min Chen, Taipei (TW)

(73) Assignee: Wonderland Nurserygoods Co., Ltd., Taipei (TW)

( * ) Notice: Subject to any disclaimer, the term of this patent is extended or adjusted under 35 U.S.C. 154(b) by 0 days.

(21) Appl. No.: 10/680,954

(22) Filed: Oct. 8, 2003

(51) Int. Cl.7 ............................. B60N 2/26; B60R 22/10
(52) U.S. Cl. ...................................... 297/484; 297/250.1
(58) Field of Search ............................. 297/484, 250.1, 297/468, 483

(56) References Cited

U.S. PATENT DOCUMENTS

| | | | | |
|---|---|---|---|---|
| 6,491,348 B1 | * | 12/2002 | Kain ........................... | 297/484 |
| 6,623,074 B2 | * | 9/2003 | Asbach et al. ............ | 297/250.1 |
| 6,626,493 B2 | * | 9/2003 | Kain ........................... | 297/250.1 |
| 6,688,685 B2 | * | 2/2004 | Kain ........................... | 297/250.1 |

* cited by examiner

Primary Examiner—Anthony D. Barfield
(74) Attorney, Agent, or Firm—Grossman Tucker Perreault & Pfleger, PLLC

(57) ABSTRACT

A child safety chair includes a backrest formed with a slot that is defined by a wall having one side. A belt-holding member is mounted movably on the backrest, has one side cooperating with the side of the wall to define a gap, and is formed with alternately disposed retaining grooves and holding ribs. A belt extends into a selected retaining groove to train on an adjacent holding rib. The belt-holding member is movable between a first position, in which the side of the belt-holding member is spaced apart from the side of the wall by a first distance, and a second position, in which the side of the belt-holding member is spaced apart from the side of the wall by a second distance that is larger than the first distance.

6 Claims, 4 Drawing Sheets

CHILD SAFETY CHAIR WITH A BELT-ADJUSTING UNIT

BACKGROUND OF THE INVENTION

1. Field of the Invention

This invention relates to a child safety chair, more particularly to a child safety chair with a belt-adjusting unit for vehicle use.

2. Description of the Related Art

FIGS. 1 and 2 illustrate a conventional child safety chair 100 for a car. The child safety chair 100 includes a seat member 71, a backrest 73 formed with a pair of elongated slots 711 extending in a longitudinal direction, and a pair of belts 72 extending through the slots 711, respectively. A belt-adjusting unit includes a pair of parallel retaining blocks 81 that are formed on a rear side of the backrest 73 and that are formed with pairs of retaining grooves 811 which are aligned in the longitudinal direction, and a belt-holding lever 74 that is mounted movably on the backrest 73 and that is adjustable to extend through a selected pair of the retaining grooves 811 in a transverse direction relative to the longitudinal direction. The belts 72 are trained on the belt-holding lever 74 so as to be adjustable together with the belt-holding lever 74 along the longitudinal direction. A pair of handles 75 are connected to the belt-holding lever 74 so as to facilitate operation of the belt-holding lever 74.

Removal of the belt-holding lever 74 from the selected pair of the retaining grooves 811 when adjusting the level of the belts 72 requires both hands of the user to operate the handles 75. However, when the child safety chair 100 is installed in a car, it becomes relatively inconvenient to operate the handles 75 with both hands due to the standing position of the user relative to the child safety chair 100, i.e., the user can only stand at one of left and right sides of the child safety chair 100, which makes the handles 75 difficult to operate using both hands.

SUMMARY OF THE INVENTION

Therefore, the object of the present invention is to provide a child safety chair that is capable of overcoming the aforesaid drawback of the prior art.

According to the present invention, there is provided a child safety chair that comprises a seat member, a backrest, a belt, and a belt-adjusting unit. The backrest extends upwardly from the seat member, has front and rear sides, and is formed with an elongated slot that extends in a longitudinal direction, that extends through the front and rear sides in a first transverse direction relative to the longitudinal direction, and that is defined by a slot-defining wall which has one side. The belt extends through the slot. The belt-adjusting unit includes a belt-holding member that is mounted movably on the rear side of the backrest, and that has a belt-holding part which is aligned with the slot in the first transverse direction, and which has one side disposed adjacent to and cooperating with the side of the slot-defining wall to define a gap therebetween. The belt-holding part is formed with a plurality of retaining grooves which are indented from the side of the belt-holding part and which are aligned in the longitudinal direction, and a plurality of holding ribs, each of which is disposed between an adjacent pair of the retaining grooves. The belt is adjustable to extend into a selected one of the retaining grooves and to train on an adjacent one of the holding ribs. The belt-holding member is movable in a second transverse direction that is transverse to the longitudinal direction and the first transverse direction between a first position, in which the side of the belt-holding part is spaced apart from the side of the slot-defining wall in the second transverse direction by a first distance that restricts removal of the belt from the selected one of the retaining grooves through the gap, and a second position, in which the side of the belt-holding part is spaced apart from the side of the slot-defining wall in the second transverse direction by a second distance that is larger than the first distance and that permits removal of the belt from the selected one of the retaining grooves through the gap.

BRIEF DESCRIPTION OF THE DRAWINGS

In drawings which illustrate an embodiment of the invention.

DETAILED DESCRIPTION OF THE PREFERRED EMBODIMENT

Figure 1:
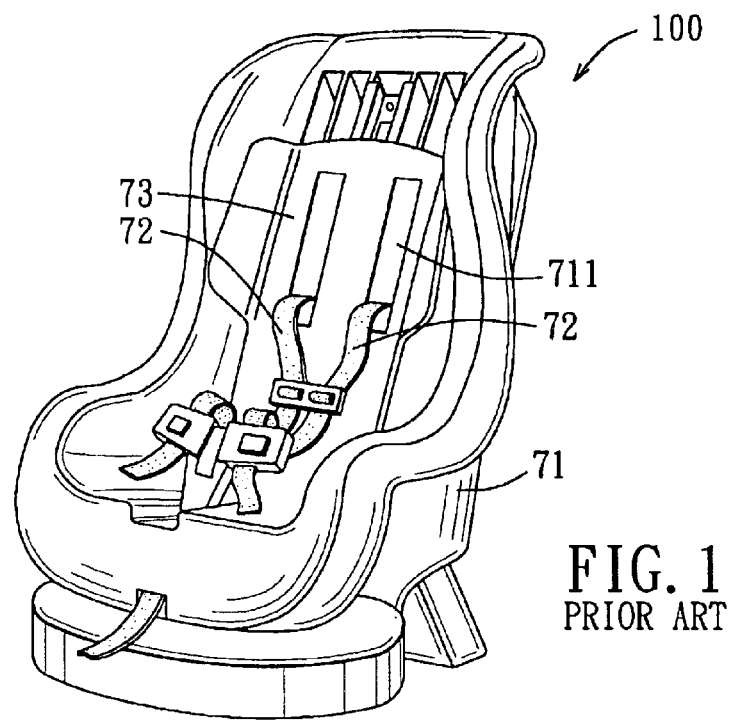
FIG. 1 is a front perspective view of a conventional child safety chair.
Figure 2:
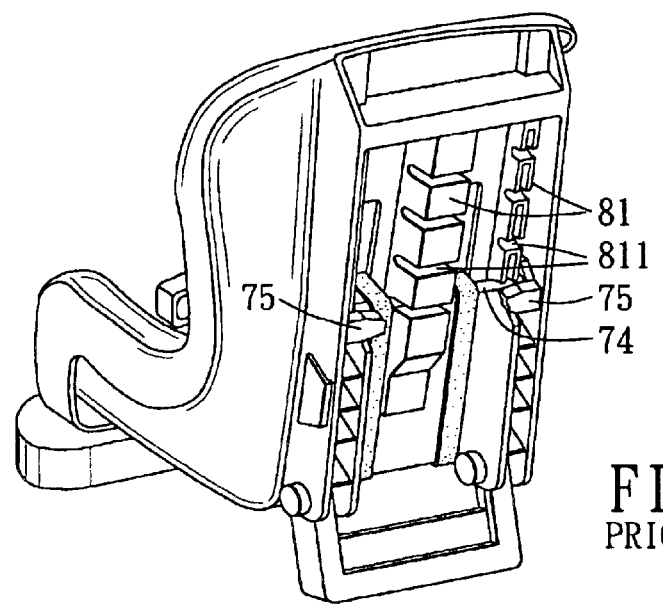
FIG. 2 is a rear perspective view of the conventional child safety chair of FIG. 1.
Figure 3:
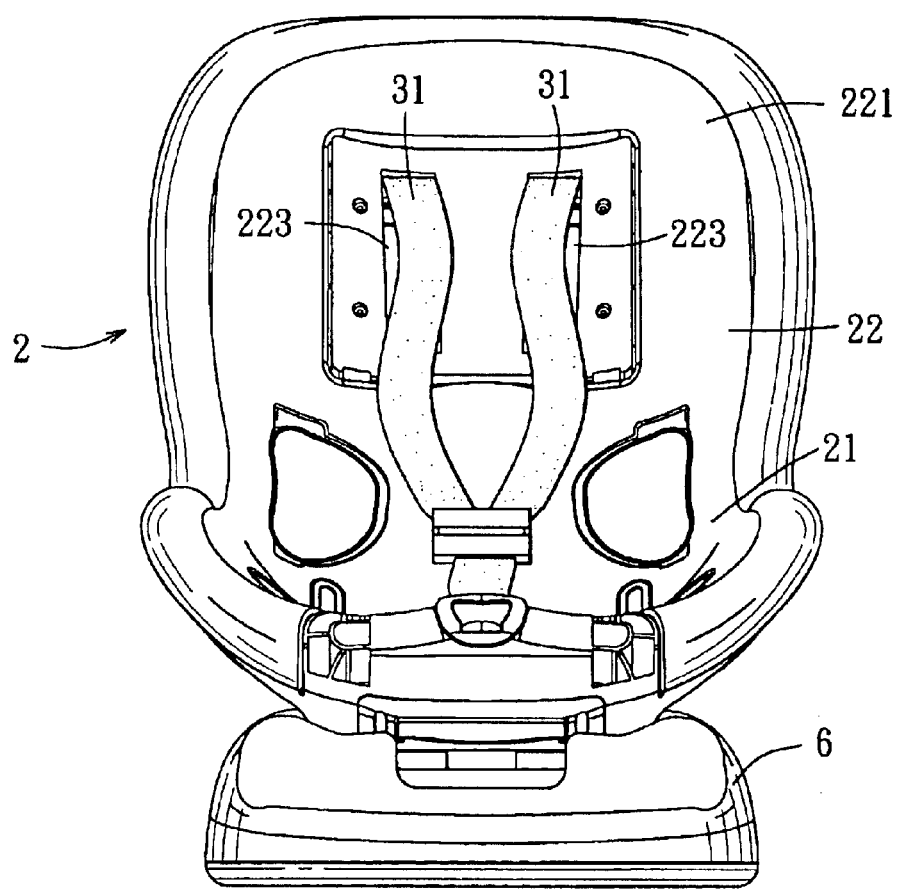
FIG. 3 is a front view of a child safety chair embodying this invention.
Figure 4:
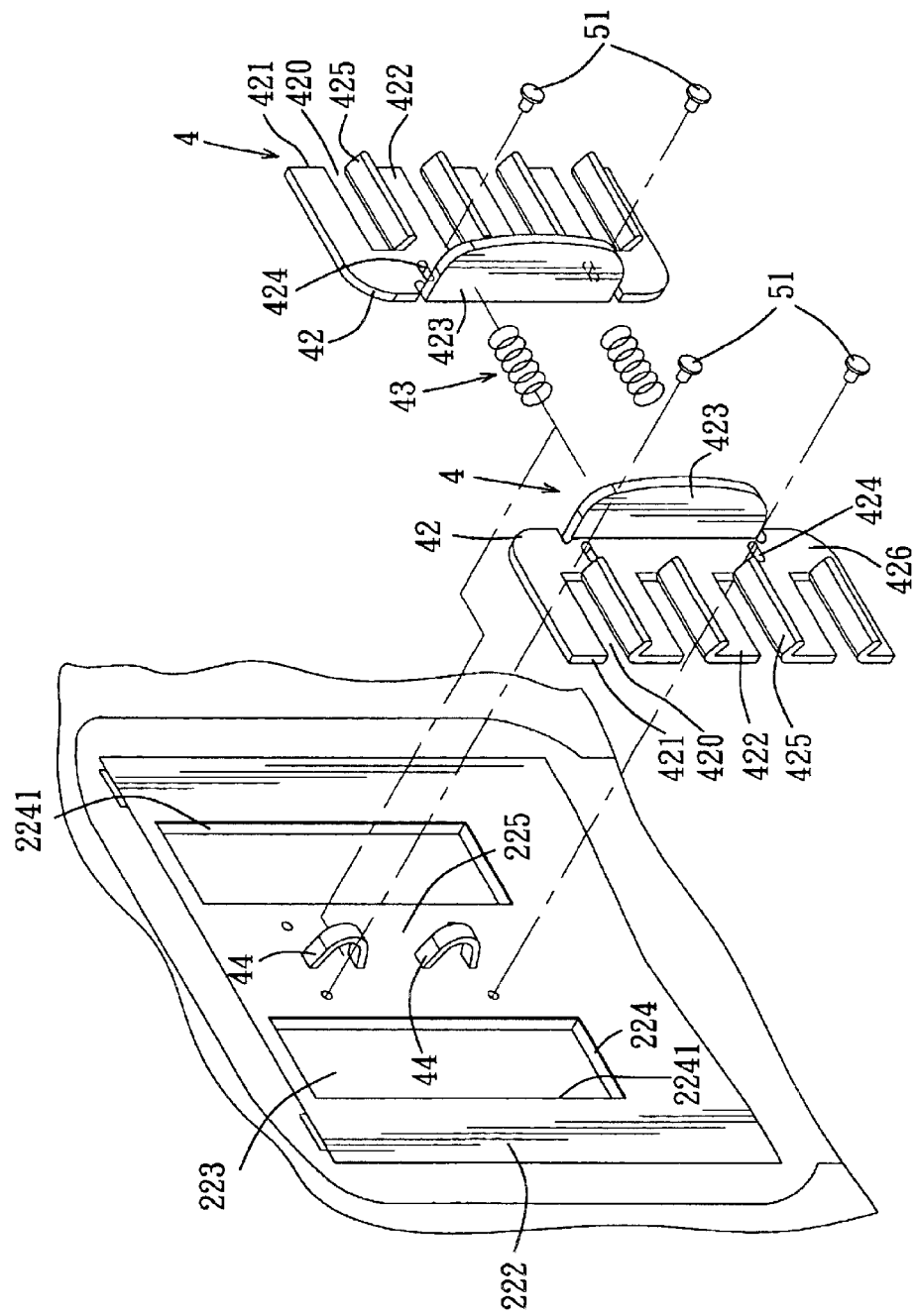
FIG. 4 is an exploded fragmentary perspective view to illustrate how a pair of belt-holding members are mounted on a rear side of a backrest of the child safety chair of FIG. 3.
Figure 5:
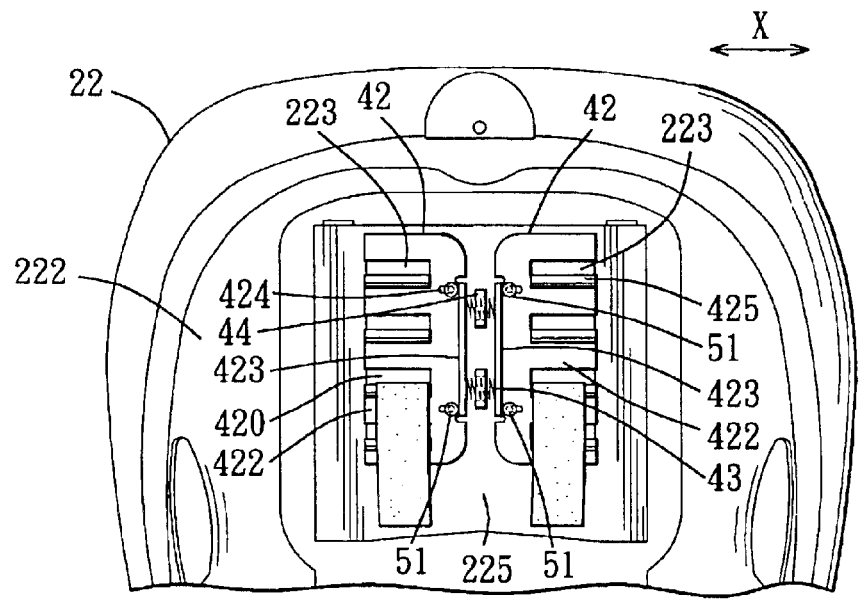
FIGS. 5 and 6 are fragmentary rear views to illustrate how a pair of belts can be adjusted in height relative to a seat member.
Figure 6:
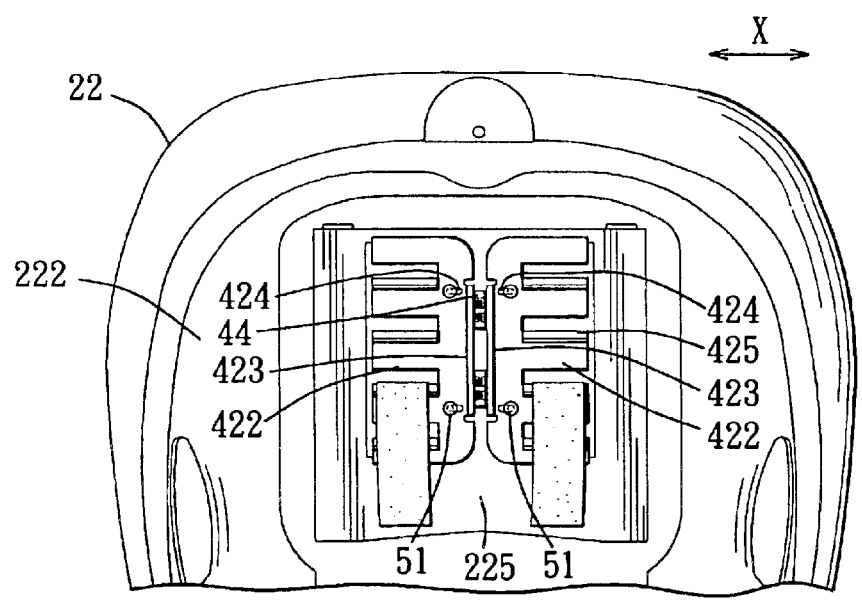

FIGS. 3 to 6 illustrate the preferred embodiment of a child safety chair 2 for a car according to this invention. The child safety chair 2 includes a base 6, a seat member 21 disposed on the base 6, a backrest 22, a pair of belts 31, and a belt-adjusting unit. The backrest 22 extends upwardly from the seat member 21, has front and rear sides 221, 222, and is formed with a pair of parallel elongated slots 223, each of which extends in a longitudinal direction and extends through the front and rear sides 221, 222 in a first transverse direction relative to the longitudinal direction, and each of which is defined by a slot-defining wall 224 which has one side 2241. The belts 31 extend through the slots 223, respectively. The belt-adjusting unit includes a pair of opposite belt-holding members 4, each of which is mounted movably on the rear side 222 of the backrest 22 adjacent to a respective one of the slots 223, and each of which has a belt-holding part 42 that is aligned with the respective one of the slots 223 in the first transverse direction, and that has one side 421 disposed adjacent to and cooperating with the side 2241 of the slot-defining wall 224 of the respective one of the slots 223 to define a gap therebetween. The belt-holding part 42 is formed with a plurality of retaining grooves 420 which are indented from the side 421 of the belt-holding part 42 and which are aligned in the longitudinal direction, and a plurality of holding ribs 422, each of which is disposed between an adjacent pair of the retaining grooves 420. Each of the belts 31 is adjustable to extend into a selected one of the retaining grooves 420 in the belt-holding part 42 of a respective one of the belt-holding members 4 and to train on an adjacent one of the holding ribs 422. Each of the belt-holding members 4 is movable in a second transverse direction (X) that is transverse to the longitudinal direction and the first transverse direction between a first position (see FIG. 5), in which the side 421 of the belt-holding part 42 is spaced apart from the side 2241 of the slot-defining wall 224 of the respective one of the slots 223 in the second transverse direction (X) by a first distance that restricts removal of the respective one of the belts 31 from the selected one of the retaining grooves 420 through the gap, and a second position (see FIG. 6), in which the side 421 of the belt-holding part 42 is spaced apart from the side 2241 of the slot-defining wall 224 of the respective one of the slots 223 in the second transverse direction (X) by a second distance that is larger than the first distance and that permits removal of the respective one of the belts 31 from the selected one of the retaining grooves 420 through the gap.

The belt-adjusting unit further includes a pair of urging members 43 mounted on the rear side 222 of the backrest 22 and disposed between and abutting against the belt-holding members 4 so as to restore the belt-holding members 4 from the first position to the second position.

The backrest 22 is formed with a spacer 225 that separates the slots 223 apart. The belt-holding part 42 of each of the belt-holding members 4 further has a side portion 426 that is opposite to the side 421 of the belt-holding part 42 and that is formed with a pair of elongated holes 424, each of which extends in the second transverse direction (X). Each belt-holding member 4 is mounted movably on the spacer 225 of the backrest 22 through screw means 51 that extend through the holes 424 in the side portions 426 of the belt-holding parts 42 of the belt-holding members 4 and into the spacer 225 so as to permit movement of the belt-holding members 4 in the second transverse direction (X).

The spacer 225 is formed with a pair of U-shaped retainers 44 disposed between the belt-holding members 4. Each urging member 43 is in the form of a coil spring that extends through and that is held by the respective U-shaped retainer 44. The belt-holding part 42 has an abutting flange 423 that extends transversely from the side portion 426 of the belt-holding part 42 in the first transverse direction. The urging members 43 are sandwiched between and abut against the abutting flanges 423 of the belt-holding parts 42 of the belt-holding members 4.

Each of the holding ribs 422 is formed with a guiding tab 425 extending transversely therefrom so as to facilitate removal of the belts 31 from the retaining grooves 420.

Adjustment of the level of the belts 31 can be conducted by pushing the belt-holding members 4 to move toward each other against urging action of the urging members 43 from the first position to the second position with one hand, and moving the belts 31 from the current retained position to a new retained position with the other hand.

By virtue of the belt-adjusting unit of the child safety chair of this invention, the aforesaid drawback of the prior art can be eliminated.

With the invention thus explained, it is apparent that various modifications and variations can be made without departing from the spirit of the present invention.

I claim:

1. A child safety chair comprising:
   a seat member;
   a backrest extending upwardly from said seat member, having front and rear sides, and formed with an elongated slot that extends in a longitudinal direction, that extends through said front and rear sides in a first transverse direction relative to said longitudinal direction, and that is defined by a slot-defining wall which has one side;
   a belt extending through said slot; and
   a belt-adjusting unit including a belt-holding member that is mounted movably on said rear side of said backrest, and that has a belt-holding part which is aligned with said slot in said first transverse direction, and which has one side disposed adjacent to and cooperating with said side of said slot-defining wall to define a gap therebetween, said belt-holding part being formed with a plurality of retaining grooves which are indented from said side of said belt-holding part and which are aligned in said longitudinal direction, and a plurality of holding ribs, each of which is disposed between an adjacent pair of said retaining grooves, said belt being adjustable to extend into a selected one of said retaining grooves and to train on an adjacent one of said holding ribs, said belt-holding member being movable in a second transverse direction that is transverse to said longitudinal direction and said first transverse direction between a first position, in which said side of said belt-holding part is spaced apart from said side of said slot-defining wall in said second transverse direction by a first distance that restricts removal of said belt from the selected one of said retaining grooves through said gap, and a second position, in which said side of said belt-holding part is spaced apart from said side of said slot-defining wall in said second transverse direction by a second distance that is larger than said first distance and that permits removal of said belt from the selected one of said retaining grooves through said gap.

2. The child safety chair of claim 1, wherein said belt-adjusting unit further includes an urging member that is mounted on said rear side of said backrest and that abuts against said belt-holding member so as to restore said belt-holding member from said first position to said second position.

3. A child safety chair comprising:
   a seat member;
   a backrest extending upwardly from said seat member, having front and rear sides, and formed with a pair of parallel elongated slots, each of which extends in a longitudinal direction and extends through said front and rear sides in a first transverse direction relative to said longitudinal direction, and each of which is defined by a slot-defining wall which has one side;
   a pair of belts extending through said slots, respectively; and
   a belt-adjusting unit including a pair of opposite belt-holding members, each of which is mounted movably on said rear side of said backrest adjacent to a respective one of said slots, and each of which has a belt-holding part that is aligned with the respective one of said slots in said first transverse direction, and that has one side disposed adjacent to and cooperating with said side of said slot-defining wall of the respective one of said slots to define a gap therebetween, said belt-holding part being formed with a plurality of retaining grooves which are indented from said side of said belt-holding part and which are aligned in said longitudinal direction, and a plurality of holding ribs, each of which is disposed between an adjacent pair of said retaining grooves, each of said belts being adjustable to extend into a selected one of said retaining grooves in said belt-holding part of a respective one of said belt-holding members and to train on an adjacent one of said holding ribs, each of said belt-holding members being movable in a second transverse direction that is transverse to said longitudinal direction and said first transverse direction between a first position, in which said side of said belt-holding part is spaced apart from said side of said slot-defining wall of the respective one of said slots in said second transverse direction by a first distance that restricts removal of the respective one of said belts from the selected one of said retaining grooves through said gap, and a second position, in which said side of said belt-holding part is spaced apart from said side of said slot-defining wall of the respective one of said slots in said second transverse direction by a second distance that is larger than said first distance and that permits removal of the respective one of said belts from the selected one of said retaining grooves through said gap.

4. The child safety chair of claim 3, wherein said belt-adjusting unit further includes an urging member mounted on said rear side of said backrest and disposed between and abutting against said belt-holding members so as to restore said belt-holding members from said first position to said second position.

5. The child safety chair of claim 4, wherein said backrest is formed with a spacer that separates said slots apart, said belt-holding part of each of said belt-holding members further having a side portion that is opposite to said side of said belt-holding part and that is formed with a pair of elongated holes, each of which extends in said second transverse direction, said child safety chair further comprising screw means extending through said holes in said side portions of said belt-holding parts of said belt-holding members and into said spacer so as to permit movement of said belt-holding members in said second transverse direction.

6. The child safety chair of claim 5, wherein said spacer is formed with a U-shaped retainer disposed between said belt-holding members, said urging member being in the form of a coil spring that extends through and that is held by said U-shaped retainer, said belt-holding part having an abutting flange that extends transversely from said side portion of said belt-holding part in said first transverse direction, said urging member being sandwiched between and abutting against said abutting flanges of said belt-holding parts of said belt-holding members.

* * * * *